United States Patent [19]

Butler et al.

[11] Patent Number: 4,506,020

[45] Date of Patent: Mar. 19, 1985

[54] METHODS OF FORMING CERAMIC MATERIALS AND CERAMIC PRODUCTS, AND CERAMIC MATERIALS AND CERAMIC PRODUCTS FORMED THEREBY

[75] Inventors: Edwin G. Butler, Hatton; Andrew Szweda, Dudley, both of England

[73] Assignee: Lucas Industries, Birmingham, England

[21] Appl. No.: 468,949

[22] Filed: Feb. 23, 1983

[30] Foreign Application Priority Data

Feb. 26, 1982 [GB] United Kingdom ................ 8206000
Aug. 25, 1982 [GB] United Kingdom ................ 8224429

[51] Int. Cl.$^3$ .................................................. C04B 35/18
[52] U.S. Cl. ........................................ 501/97; 501/98; 264/65; 264/66
[58] Field of Search .................. 501/97, 98, 152; 264/65, 66

[56] References Cited

U.S. PATENT DOCUMENTS

| | | | |
|---|---|---|---|
| 3,262,761 | 7/1966 | Bechtold | 501/97 |
| 3,356,513 | 12/1967 | Washburn | 501/97 |
| 4,113,503 | 9/1978 | Lumby et al. | 264/65 |
| 4,127,416 | 11/1978 | Lumby et al. | 501/152 |
| 4,184,884 | 1/1980 | Jong | 264/65 |
| 4,243,621 | 1/1981 | Mori et al. | 501/98 |

FOREIGN PATENT DOCUMENTS 0003769 1/1982 Japan ................................. 501/97

*Primary Examiner*—Winston A. Douglas
*Assistant Examiner*—Terryence Chapman
*Attorney, Agent, or Firm*—Holman & Stern

[57] ABSTRACT

A method of producing a dense ceramic product comprises the steps of mixing a ceramic powder containing a major proportion of an alpha-phase substituted silicon nitride obeying the formula $M_x(Si,Al)_{12}(O,N)_{16}$, where x is not greater than 2 and M is a modifying cation (e.g. yttrium, calcium, lithium, magnesium, cerium) with at least one nitride of silicon and/or alumina wherein the alumina represents not more than 10% by weight of the mixture; and sintering the mixture in a non-oxidizing atmosphere at a temperature of 1700° C. to 1900° C. so as to produce (1) a dense ceramic product consisting essentially of beta-phase substituted silicon nitride having the general formula $Si_{6-z}Al_zN_{8-z}O_z$, where z is greater than zero and not greater than 1.5, and 0.05% wt to 20% wt of a further phase containing said modifying cation M, or (2) a dense ceramic product consisting essentially of said beta-phase substituted silicon nitride a 0.05% wt to 90% wt of an alpha-phase substituted silicon nitride obeying said formula $M_x(Si,Al)_{12}(O,N)_{16}$ and a minor amount of a further phase containing said modifying cation M.

22 Claims, No Drawings

METHODS OF FORMING CERAMIC MATERIALS AND CERAMIC PRODUCTS, AND CERAMIC MATERIALS AND CERAMIC PRODUCTS FORMED THEREBY

This invention relates to methods of forming ceramic materials and ceramic products, and to ceramic materials and ceramic products formed by such methods. The invention is particularly concerned with a substance which will be broadly referred to as substituted silicon nitride which has the advantage of possessing high strength and high hardness and is useful for the manufacture of tool tips, gas turbine parts and seals by means of a sintering operation. A typical example of substituted silicon nitride is a beta-phase lattice structure of silicon nitride ($Si_{12}N_{16}$) which has been expanded as a result of partial substitution of the silicon atoms by aluminium atoms and substitution of some of the nitrogen atoms by oxygen atoms. However, it is to be appreciated that the beta-phase silicon nitride lattice can have substituting elements other than aluminium and oxygen at its atomic sites providing the valency balance is retained. Another example of a substituted silicon nitride is an alpha phase silicon nitride lattice which has been expanded by replacement of some of the silicon atoms by aluminium atoms and the introduction of modifying cations, e.g. yttrium, calcium and lithium, into the interstices of the lattice in order to achieve valency balance. This valency balancing is normally achieved by the use of the oxides of these modifying cations and, as a result, oxygen will be introduced into the lattice at some of the nitrogen sites. The term "substituted silicon nitride" as used herein is to be construed accordingly.

In an article entitled "α'-Sialon Ceramics" by S. Hampshire, H. K. Park, D. P. Thompson and K. H. Jack, Nature Vol. 274 No. 5674 pp. 880–882, Aug. 31, 1978, it states that the X-ray photographs of FIG. 5 show that α' reacts with $Al_2O_3$ to give β' and exemplifies this with the following equation:

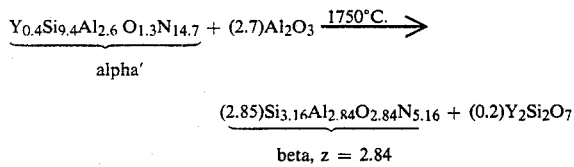

$$\underbrace{Y_{0.4}Si_{9.4}Al_{2.6}O_{1.3}N_{14.7}}_{\text{alpha}'} + (2.7)Al_2O_3 \xrightarrow{1750°C}$$

$$\underbrace{(2.85)Si_{3.16}Al_{2.84}O_{2.84}N_{5.16}}_{\text{beta, z = 2.84}} + (0.2)Y_2Si_2O_7$$

However, as pointed out in our earlier UK Pat. No. 1,578,434, the strength of beta '-sialons begins to decrease as the z value increases above the order of 1.5 and so while the Nature article referred to above has caused the alpha ' sialon to be converted to a high z value beta '-sialon with a second phase containing yttrium, such a product will not perform well as an engineering ceramic. We have found that by reacting a powder containing a major proportion of the alpha-phase substituted silicon nitride with less than 10% by weight of alumina (the Nature article used 33% by weight) and/or at least one nitride of silicon (as defined hereinafter), beta '-phase substituted silicon nitrides having z values less than or equal to 1.5 can be produced together with controlled amounts of other crystalline phases, and a controlled amount of a glass phase whereby the strength of the product is acceptable as an engineering ceramic with good retention of properties at high (c 1200° C.) temperature.

We have also found that as the alumina content in the starting mix is decreased below 10% by weight, there is a progressive increase in content of the alpha-substituted silicon nitride phase in the sintered product at the expense of the beta-substituted silicon nitride phase of z values below 1.5, with controlled levels of glass, whereby not only is the strength at room temperature and high temperature good, but the hardness is improved over that of the product in which the alpha-phase substituted silicon nitride is absent, for the same minimal glass level. However, it has been found that as the alumina content is progressively decreased, it becomes difficult to form products in which the beta-phase substituted silicon nitride has very low z values (<0.75). It has been found that by supplementing or partially or wholly replacing the alumina addition with an addition of a nitride of silicon to the powder containing a major proportion of the alpha-phase substituted silicon nitride, it is possible to reduce the z values of the beta-phase substituted silicon nitride below 0.75. It will therefore be appreciated that by adding silicon nitride, or alumina in an amount not more than 10% by weight (or by adding both silicon nitride and alumina with the alumina being in an amount not more than 10% by weight to the powder containing a major portion of alpha-phase substituted silicon nitride), it is possible to produce ceramic products comprising beta-phase substituted silicon nitride of z values up to 1.5 with controlled amounts of other crystalline and glass phases, and in which the crystalline phases can include alpha-phase substituted silicon nitride.

While the additive to the high alpha-phase substituted silicon nitride is described above as being silicon nitride and/or alumina, other additives which provide the required elements silicon, nitrogen, aluminium and oxygen could be used, for example silicon oxynitride would be a suitable additive and/or a so-called "polytype" which is a silicon aluminium oxynitride having the crystal lattice structure of aluminium nitride in which silicon has partially replaced aluminium atoms and oxygen atoms have partially replaced nitrogen atoms while maintaining electrical balance. The term "nitride of silicon" as used herein is to be construed accordingly.

According to a first aspect of the present invention, there is provided a method of producing a dense ceramic product comprising the steps of mixing a ceramic powder containing a major proportion of an alpha-phase substituted silicon nitride obeying the formula $$M_x(Si,Al)_{12}(O,N)_{16}$$

where x is not greater than 2 and M is a modifying cation (e.g. yttrium, calcium, lithium, magnesium, cerium) with at least one nitride of silicon and/or alumina wherein the alumina represents not more than 10% by weight of the mixture; and sintering the mixture in a non-oxidising atmosphere at a temperature of 1700° C. to 1900° C. so as to produce (1) a dense ceramic product consisting essentially of beta-phase substituted silicon nitride having the general formula

$$Si_{6-z}Al_zN_{8-z}O_z$$

where z is greater than zero and not greater than 1.5 and a minor amount of a further phase containing said modifying cation element M, or (2) a dense ceramic product consisting essentially of said beta-phase substituted silicon nitride, a controlled amount (eg. 0.05% wt. to 90% by wt.) of an alpha-phase substituted silicon nitride obeying said formula $$M_x(Si,Al)_{12}(O,N)_{16}$$

and a minor amount (eg. 0.05% wt. to 20% wt.) of a further phase containing said modifying cation element M.

The required sintering time depends upon the sintering temperature and is at least 10 minutes when a sintering temperature of 1900° C. is employed and longer when lower temperatures within the range are employed.

Because of the excellent properties of substituted silicon nitride both the final product and any intermediary products are extremely difficult to work and much research has been conducted into methods of manufacturing final products in which working of the materials is minimised. In further efforts to devise economical production routes, much research has been conducted into ways of simplifying the operating parameters such as avoiding the use of high pressure, reducing time, temperatures, and also avoiding other expensive steps.

To produce the dense ceramic product (2) above, it is preferred to employ not greater than 7.5% by weight of $Al_2O_3$ in the mixture to be sintered.

In the manufacture of substituted silicon nitride products, it is advantageous to form an intermediate material which is comminuted into a powder, and then to react this intermediate powder with further powdered constituents to obtain the final product. Such a method is described in GB No. 1,573,199 in which a process is described wherein a mixture of aluminium, silicon and alumina is heated in a nitriding atmosphere following a heating schedule controlled so as to substantially prevent exotherming. Following this, the material is then crushed and ground before being sintered in a protective environment to produce an intermediate which is a ceramic material containing a silicon aluminium oxynitride which obeys a different formula to that desired of the final product. This material is a "polytype". Subsequent to sintering, the intermediate ceramic material is crushed and milled to form a powder. This powder is mixed with silicon nitride powder which contains silica as an impurity, and with a temporary binder. One or more glass forming oxides such as oxides of magnesium, manganese, iron, boron, lithium, yttrium, and other rare earth oxides, may be included in the mixture. The mixture is cold pressed to form a preform which is then spray coated with a protective mixture of boron nitride and silica in a ketone carrier liquid. The preform is then open sintered by heating to a temperature of 1200° C. to 2000° C. to produce a final ceramic product which includes at least 90% by weight of a single phase silicon aluminium oxynitride having a crystal structure based on beta-silicon nitride but of increased unit cell dimensions and which obeys the general formula:

$$Si_{6-z}Al_zN_{8-z}O_z,$$

wherein z is greater than zero and not greater than 5. This type of process possesses a number of advantages. First, it avoids using aluminium nitride as a starting material, it being appreciated that aluminium nitride is very hygroscopic and therefore difficult to store and handle, as well as requiring processing in a water-free environment. Secondly, an open sintering technique is employed to produce the final shape of the ceramic product. However, this method does require expensive jaw crushing to be effected during manufacture of the intermediate ceramic material and on the intermediate before it can be used in the manufacture of the final product.

Prior art workers with alpha-phase substituted silicon nitride have been intent on producing dense, hard products, and while it is possible to comminute such products and employ the resultant powder as one of the starting materials in the method according to the first aspect of the invention, it is unattractive to do so as a production process. It is possible to manufacture the prior art alpha-phase substituted silicon nitride and avoid all steps in the process which assist densification and while such processing does ease comminution and allows the method according to the first aspect of the present invention to be conducted more readily, it still requires an expensive comminution step such as jaw crushing. It should also be noted that any comminuting process besides increasing production cost also introduces impurities into the reacting species which could prove detrimental to the reproducibility of finished products.

An object of a second aspect of the present invention is to provide a method of manufacturing the ceramic powder containing a major proportion of said alpha-phase substituted silicon nitride, which does not require an expensive comminution step such as jaw crushing.

According to said second aspect of the present invention, there is provided a method of manufacturing a ceramic material comprising the steps of effecting a first stage nitriding by heating a powder mixture comprising silicon, aluminium, alumina and an oxide or nitride of a modifying cation element (eg. yttrium, calcium, lithium, magnesium, cerium) in a nitriding atmosphere at a temperature below the melting point of aluminium until said first stage nitriding is substantially complete; effecting a second stage nitriding by heating the first stage nitrided mixture at a temperature below the melting point of silicon whilst maintaining a nitriding atmosphere until the second stage nitriding is substantially complete whereby a friable material is produced; comminuting the friable material thus produced; and subsequently sintering the comminuted friable product at a temperature between 1500° C. and 1900° C. whilst maintaining a non-oxidising atmosphere to obtain a friable ceramic material including more than 50% by weight of an alpha-phase substituted silicon nitride obeying the formula:

$$M_x(Si,Al)_{12}(O,N)_{16},$$

where x is not greater than 2 and M is the modifying cation element, or a friable ceramic material including greater than 50% by weight of a mixture of said alpha-phase substituted silicon nitride and a beta-phase substituted silicon nitride of the formula:

$$Si_{6-z}Al_zN_{8-z}O_z,$$

where z is greater than zero and not greater than 1.5.

The relative proportions of the alpha-phase to beta-phase substituted silicon nitrides depends upon the temperature of the sintering step, the higher the temperature within the specified range of 1500° C. to 1900° C., the greater will be the proportion of the alpha-phase material for a given treatment time.

The powder mixture employed in the above method may also include silicon nitride and/or aluminium nitride.

Preferably, the friable ceramic material which includes a mixture of the alpha and beta phases of substituted silicon nitride contains more than 50% by weight of the alpha-phase material. This is preferably effected by performing the final sintering step at a temperature between about 1700° C. and 1900° C.

The proportion of the ingredients of the powder mixture which are employed will, of course, depend upon the type of friable ceramic product which is required. Most preferably, the proportions of the ingredients of the powder mixture are chosen so that the resultant friable ceramic material consists substantially completely of the alpha-phase material or substantially completely of the mixture of the alpha and beta phase materials.

In the case where calcium is used as the modifying element, the alpha-phase ceramic material may have the formula:

$$Ca_{0.5}Si_{10.5}Al_{1.5}O_{0.5}N_{15.5}$$

or the formula:

$$Ca_{0.8}Si_{9.2}Al_{2.8}O_{1.2}N_{14.8}.$$

In the case where the modifying cation element is lithium, the alpha-phase ceramic material typically has the formula $$LiSi_{10}Al_2ON_{15}$$

In the case where the modifying cation element is yttrium, the alpha-phase ceramic material may have the formula $$Y_{0.4}Si_{10}Al_2O_{0.8}N_{15.2}$$

or the formula:

$$Y_{0.6}Si_{9.2}Al_{2.8}O_{1.1}N_{14.9}$$

The proportions of the ingredients will therefore preferably be taken so as to substantially balance according to the appropriate formula.

The friable ceramic material formed by the method according to the second aspect of the present invention is suitable as an intermediate in the formation of a dense ceramic product consisting essentially of the above described beta-phase material, and a minor proportion of a further phase containing said modifying cation element; or a dense ceramic product consisting essentially of the above described beta-phase material, a controlled amount (eg. 0.05% by weight to 90% by weight) of the alpha-phase material and a minor proportion of a further phase containing said modifying cation element.

Thus, according to a third aspect of the present invention, there is provided a method of manufacturing a ceramic product comprising the steps of mixing a friable ceramic material formed by the method according to said second aspect of the present invention in powder form with at least one nitride of silicon and/or alumina wherein the alumina occupies not more than 10% by weight of the mixture; and sintering the mixture in a non-oxidising atmosphere at a temperature of 1700° C. to 1900° C. so as to produce (1) a dense ceramic product consisting essentially of beta-phase substituted silicon nitride having the general formula $Si_{6-z}Al_zO_zN_{8-z}$, where z is greater than zero and not greater than 1.5, and a minor amount of a further phase containing said modifying cation element M, or (2) a dense ceramic product consisting essentially of said beta-phase substituted silicon nitride, a controlled amount (eg. 0.05% weight to 90% by weight) of an alpha-phase substituted silicon nitride obeying said formula $M_x(Si,Al)_{12}(O,N)_{12}$, and a minor amount (eg. 0.05% weight to 20% weight) of a further phase containing said modifying cation element M.

The required sintering time depends upon the sintering temperature and is at least 10 minutes at 1900° C. and longer when lower temperatures in the range are employed.

Conveniently the ceramic powder represents 5 to 96.5% by weight of the mixture containing the ceramic powder.

Conveniently the ceramic powder is present in an amount of less than 30% by weight of the mixture containing said ceramic powder and at least one glass forming metal oxide selected from yttrium oxide, calcium oxide, lithium oxide, cerium oxide, rare earth oxides and oxides of the lanthanide series, magnesium oxide, manganese oxide, and iron oxide is also included in the mixture containing said ceramic powder.

Most conveniently the said at least one glass forming metal oxide is included in an amount of less than 10% by weight of the mixture containing said ceramic powder.

Preferably, the silicon nitride is present in an amount up to 75% by weight of the mixture containing said ceramic powder, more preferably between 5 and 75% by weight.

Conveniently the product after cooling is reheated to devitrify the glass phase, preferably at a temperature not greater than 1400° C.

In a first example according to said first aspect of the invention a mixture comprising 79.3% by weight of silicon nitride powder (containing about 90% of the alpha-phase) having an average particle size of 2 microns and containing 5% by weight of silica as an impurity as supplied by Lucas Syalon Limited under the designation Si$_3$N$_4$(K$_2$) 13.0% by weight of aluminium nitride powder having an average particle size of 10 microns and containing 6% by weight of alumina as an impurity as supplied by Stark, W. Germany, and 7.7% by weight of yttria powder as supplied by Rare Earth Products Limited having a particle size of about 1 micron was ball milled using alumina balls for 24 hours whereby a 2% by weight pick-up of alumina occurred in addition to the alumina which was inherent on the aluminium nitride powder. The mixed powder was then introduced in loose form into a furnace where the temperature was slowly raised in the presence of a nitriding atmosphere to 1820° C. and was held for 5 hours. The product upon cooling was found to comprise a major proportion (98%) of the alpha-phase substituted silicon nitride, yttrium being the modifying cation, together with a minor proportion, estimated as being of the order of 2% of the beta-phase substituted silicon nitride of the formula $Si_{6-z}Al_zN_{8-z}O_z$ with a z value of the order of 0.3.

The sintered product was a hard sintered cake and required to be jaw crushed to form it into an intermediary powder capable of being subsequently processed. 90 parts by weight of the jaw-crushed intermediary powder was then mixed with 10 parts by weight of the silicon nitride used earlier and was again ball-milled using alumina media until the alumina pick-up amounted to 8.45 parts by weight. The resulting powder was then isostatically pressed at 20,000 psi (140 MN.m$^{-2}$) and sintered in a furnace containing a nitriding atmosphere where the temperature was raised to 1750° C. and held for 5 hours.

The crystalline phases detected in the product were beta-phase substituted silicon nitride occupying of the order of 96%, together with approximately 3% of a polytype crystalline phase designated as 12H and with a trace of B-phase ($Y_2SiAlO_5N$). The z value of the beta-phase major constituent was of the order 1.5 and the modulus of rupture in 3-point bend was of the order 90,000 psi (620 MN.m$^{-2}$). While this experiment confirmed the method of the first aspect of the invention in producing products containing beta-phase substituted silicon nitride having z values less than or equal to 1.5 from an intermediary powder having a major constituent of alpha-phase substituted silicon nitride; all subsequent processing was conducted with an intermediary powder produced according to the second aspect of the invention, ie. one which was of a friable consistency not requiring expensive comminuting.

In a second example which forms a control example for a second aspect of the invention, a mixture comprising 29.5% by weight of silicon powder as supplied by Kema Nord of Sweden having a particle size of less than 20 microns, 10.6% by weight of aluminium powder supplied by Johnson and Bloy Limited as "120 dust", 49% by weight of silicon nitride (containing about 90% of the alpha-phase) having an average particle size of 2 microns and containing 5% by weight of silica as an impurity as supplied by Lucas Syalon Limited under the designation $Si_3N_4(K_2)$, 1.4% by weight of alumina powder supplied by The Aluminium Company of America and known as ALCOA XA15, having a mean particle size of 1 micron, and 9.5% by weight of yttria powder as supplied by Rare Earth Products Limited having a particle size of about 1 micron, was homogeneously mixed in a Nautamix mixer. The weight percentages were so arranged that the atomic ratios of the elements were in accordance with the formula $Y_{0.4}Si_{10}Al_2O_{0.8}N_{15.2}$ The yttria was present to provide modifying cations. The mixture was introduced into a nitriding furnace and the temperature was increased at a rate of about 10° to 15° C. per minute to 640° C. in the presence of a nitriding atmosphere of nitrogen and hydrogen. At this temperature, an exothermic reaction began and the mixture was nitrided at a temperature of 640° C. for 20 hours. The exothermic reaction was controlled by monitoring the temperature of the mixture and the temperature of the walls of the furnace and by diluting the nitriding atmosphere with argon when necessary to prevent the exothermic reaction from taking place so vigorously that the required temperature of 640° C. would be exceeded. Thus, it was ensured that the temperature of the mixture did not rise above the melting point of aluminium (about 660° C.). When exothermic was no longer detected by the aforesaid temperature monitoring of the mixture and of the walls, this was taken to indicate that this first stage in the nitriding process had reached completion.

The temperature in the furnace was then raised to 1200° C. while maintaining the same nitriding atmosphere as was used in the first stage. The mixture was held at this temperature for 10 hours after which it was increased to 1250° C. and held for 5 hours, further increased to 1300° C. and held for 5 hours, then increased to 1350° C. and held for 5 hours and finally increased to 1400° C. and maintained at this temperature for a further 10 hours. The progress of the reaction at this stage was monitored by monitoring the temperature of the mixture and the temperature of the furnace walls as in the first stage nitriding and excess temperatures controlled by diluting the atmosphere with argon when necessary. In this second stage nitriding, the absence of exotherming was taken to indicate that nitriding had been completed. The resultant material was a nitrided mixture which was friable and easily broken up, after cooling, by a simple steel ball-milling operation. There was no need to employ an expensive comminuting operation such as jaw crushing at this stage.

The powdered material so obtained was then loaded into a graphite pot and heated in a furnace to 1600° C. at a heating rate of about 10° to 15° C. per minute whilst maintaining a non-oxidising atmosphere which, in this example, was nitrogen at 1 atm pressure. The material was held for 5 hours at this temperature during which it was reacted. After reaction, the material was removed from the furnace and allowed to cool at room temperature. The resultant ceramic material was of a friable consistency and required little working to reduce it to powdered form for subsequent use. However, X-ray spectroscopy analysis of the material showed it to comprise 30% by weight of alpha-phase substituted silicon nitride of the formula $Y_{0.4}Si_{10}Al_2O_{0.8}N_{15.2}$ and 50% by weight of beta-phase silicon aluminium oxynitride of the formula $Si_{4.6}Al_{1.4}N_{6.6}O_{1.4}$, together with 15% unreacted alpha-silicon nitride and 5% yttria. While this product does not contain a major proportion of the alpha'-phase substituted silicon nitride and therefore does not come within the scope of the invention, it does act as a control experiment for the following examples.

Example 2 was repeated for a number of further samples except that in the final sintering step, the temperature of successive samples was increased while maintaining each sample at the defined temperature for 5 hours as used in Example 2. The following table 1 summarises the results of these experiments.

TABLE 1

| Eg. No. | Sintering Temp. °C. | Sintering Time Hrs | Alpha-Phase Weight % | Beta-Phase Weight % | Other Phases |
|---|---|---|---|---|---|
| 2 | 1600 | 5 | 30 | 50 | 15 $Si_3N_4$, 5 $Y_2O_3$. |
| 3 | 1700 | 5 | 60 | 40 | — |
| 4 | 1750 | 5 | 72 | 28 | — |
| 5 | 1800 | 5 | 92.6 | 7.4 | — |
| 6 | 1820 | 5 | 97 | 3 | — |

It will be appreciated from Table 1, Examples 2 to 5 that the ratio of the alpha-phase material to the beta-phase material in the ceramic material produced can be controlled by choosing the temperature of the final sintering stage, the higher the temperature the greater the alpha-phase material for a given sintering time. Under the conditions quoted ie. 1 atm pressure of nitrogen in the above examples, it was found that the maximum temperature at which the maximum quantity of alpha-phase substituted silicon nitride was formed was of the order of 1820° C. and the minimum temperature at which a major proportion of alpha-phase substituted silicon nitride ie. >50% would be present was estimated to be of the order of 1650° C.

A further set of experiments was conducted using the presintered samples according to Example 2 to investigate the effect of time at temperature and the effect of higher temperatures than the maximum temperature used in the experiments of Table 1. The results of these tests are summarised in Table 2.

TABLE 2

| Eg. No. | Sintering Temp. °C. | Sintering Time Hrs | Alpha-Phase Weight % | Beta-Phase Weight % | Other Phases |
|---|---|---|---|---|---|
| 7 | 1800 | 2 | 87 | 13 | — |
| 8 | 1820 | 2 | 89 | 11 | — |
| 9 | 1870 | 2 | 63 | 37 | — |
| 10 | 1900 | 2 | 92.6 | 7.4 | Free Si. |
| 11 | 1820 | 1 | 76 | 24 | — |

From the above tables it will be appreciated for example from samples 11, 8 and 6 that as the time at temperature increases the alpha/beta-phase ratio increases. However, from samples 8 and 9 it can be seen that increasing the temperature to 1870° C. for 2 hours while using the condition of 1 atmosphere of nitrogen the alpha/beta-phase ratio had started to fall, while from example 10 at 1900° C. for 2 hour dissociation was occuring and other phases were beginning to appear in the friable product. It can therefore be concluded that while products high in alpha-phase can be produced up to temperatures of the order of 1900° C. maximum, temperatures of the order of 1820° C. appear to allow close control over the products in reasonable sintering times (of the order of 5 hours). It will also be appreciated that such absolute values of temperature will also be influenced by other conditions within the furnace, such as pressure and it would be advisable for some preliminary experimentation to be conducted to quantify conditions for the manufacturing facility which is to be used.

Whilst silicon, aluminium, silicon nitride, alumina and yttria were employed as the starting materials in the above examples, it will be appreciated that useful friable ceramic materials can be obtained using a nitride of yttrium and/or by using an oxide and/or nitride of other modifying cations such as calcium, lithium, magnesium or cerium. Further, it is to be appreciated that the use of silicon nitride as one of the starting materials is not essential. However, since the nitriding operation is exothermic, it can be advantageous to include silicon nitride because this not only helps to control the exothermic reaction but also permits a high nitriding temperature to be employed without thermal runaway occurring, thus enabling an overall highly efficient nitriding step. For the same reason, aluminium nitride may be included as one of the starting materials in addition to or in place of aluminium. However, as the quantity of silicon nitride and/or aluminium nitride is progressively increased at the expense of the silicon and/or aluminium respectively, the effectiveness of the invention diminishes. Consequently, it is considered preferable to incorporate silicon nitride and/or aluminium nitride in amounts such that the weight ratio of silicon nitride to silicon, or aluminium nitride to aluminium is not greater than 3 to 1.

In a series of examples according to the first and third aspects of the invention, 800 g. samples of the friable intermediary powder having a high proportion of alpha-phase substituted silicon nitride produced according to Example 3, ie having 72 wt.% alpha'-phase and 28 wt.% beta'-phase(beta-phase substituted silicon nitride) were ball milled using a spherical mill containing a mixed $Al_2O_3$ charge (ie. $\frac{1}{4}''$, $\frac{1}{2}''$, $\frac{3}{4}''$ media) and milled for 24 hours to give a 3.47 wt.% $Al_2O_3$ pick-up and for 24 hours in a cylindrical mill giving a 5.41 wt.% $Al_2O_3$ pick-up respectively. Further 800 g. samples were milled in a cylindrical mill using $\frac{1}{4}''$ media for 24 hours to give a 6.88 wt.% $Al_2O_3$ pick-up and 48 hours to give a 9.19 wt.% $Al_2O_3$ pick-up respectively. All processing used isopropyl alcohol (i-p-a) carrier liquid. All slurries were dried in an air oven at 120° C., the powders sieved and then isopressed at 20,000 psi (140 $MN.m^{-2}$) into billets for sintering in a nitrogen atmosphere. Table 3 summarises the processing conditions, products and properties which resulted.

TABLE 3

| Eg. No. | $Al_2O_3$ wt. % | Temp. °C. | Time Hrs. | Further Treatment | Properties | | | Density $g.cc^{-1}$ | Phases Weight % |
|---|---|---|---|---|---|---|---|---|---|
| | | | | | Hardness Rockwell A | MR (RT) $MN.m^{-2}$ | MR 1200° C. $MN.m^{-2}$ | | |
| 12 | 3.47 | 1820 | 2 | — | 92.5 | 537.8 | 580.5 | 3.29 | 20%α', 5% B t.YAG r.β'. |
| 13 | 5.41 | | | 1400° C. 5 hrs. | 92 | 516.4 | 475.7 | 3.27 | 15%α', t.YAG r.β'. |
| 14 | 6.88 | 1750* | 5* | — | — | 530.9 | — | 3.28 | 10%α', t.YAG r.β'. |
| 15 | 9.19 | | | 1400° C. 5 hrs. | 91.7 | 465.4 | 372.3 | 3.27 | No α', 10% B 5% 12H, r.β'. |

B = B—phase ($Y_2SiAlO_5N$);
t.YAG = trace yttrium aluminium garnet;
r = remainder.
*Samples held at 1600° C. for 2 hours as intermediate stage.

From examples 12 to 15 it can be seen that useful engineering ceramics have been produced exhibiting good density, strength and hardness properties. No alpha'-phase constituent was detected for alumina pick-ups greater than an estimated 7.5% by weight however, the main phase under these conditions being beta'-phase of the order of 85 wt.%. As the alumina content has decreased below about 7.5% by weight the amount of alpha'-phase progressively increases. Where, in the examples given, the intermediary phase contains of the order of 28 wt.% beta'-phase, then it would not be possible to produce dense final products containing less than this amount of beta'-phase without adding aluminium nitride to the mixture. Where products containing less than 28 wt.% beta'-phase are required in the final product, then the intermediary phase must possess an appropriate amount of beta'-phase, or have inclusions of the appropriate amount of aluminium nitride.

By keeping the alumina content below an order of 10% and greater than of the order of 7.5% by weight, it is possible to ensure that products high in beta'-phase having 0.75 z 1.5 will be obtained with controlled levels of other crystalline phases.

In a sixteenth example according to the first and third aspects of the invention, silicon nitride powder was used in addition to alumina powder to extend the range of products obtained, especially allowing the capability of controlling the z values of the beta'-phase to lower values than those obtainable with alumina pick-up alone.

75 parts by weight of the intermediary powder according to Example 5 was mixed with 25 parts by weight of silicon nitride powder supplied by Kennametal of the United States of America and ball milled using alumina media in i-p-a for 72 hours when it was found that the starting mix had picked up 8.89 parts by weight of alumina. The fine powder so produced was then dried and isopressed as in Examples 12 to 15 and sintered in a nitrogen atmosphere at 1600° C. for 2 hours, followed by 1750° C. for 5 hours. The resultant product was found to contain as a major constituent beta'-phase material together with an order of 3% weight 12H and exhibited a density of 3.23 gcc$^{-1}$ and a room temperature Modulus of Rupture in three-point bend of 89,800 psi (620 MN.m$^{-2}$) with a Rockwell 'A' Hardness of 92. The z value of the beta'-phase material was found to be 0.8.

Further samples were prepared using $Si_3N_4$ and $Al_2O_3$ as in Example 13 together with the friable intermediary of Example 5 and the processing and products are summarised in Table 4.

it is preferred to use an oxide of the metal forming the cation of the alpha'-phase.

Comparison of Examples 18 and 19 shows that an increase in the z value of the final beta'-phase can be achieved by increasing the amounts of alumina and intermediary phase and decreasing the amount of silicon nitride. In Examples 18 and 19 the total yttrium level is maintained substantially constant. In order to produce the alpha'-phase in the final product, Examples 16 and 17 were repeated but with the alumina content being reduced to 6.13% and 8.1% by weight respectively. The resultant products were found to contain alpha'-phase, that using the starting constituents of Example 16 but lower $Al_2O_3$ content contained 15 wt.% of alpha'-phase, while that of Example 17 with lower $Al_2O_3$ contained 5 wt.%. When Example 16 (ie. a high proportion of intermediary powder, high in alpha'-phase content) was repeated with the alumina level reduced to 2% by weight, the resultant product contained 80 wt.% alpha'-phase.

In a twentieth Example of the invention 95 parts by weight of the friable ceramic material produced according to Example 5, ie. 92.6% alpha'-phase/7.4% beta'-phase, were mixed with 5 parts by weight of the silicon nitride Example 1 and the mixture was colloid milled to a fine particle size, it being appreciated that by colloid milling no pick-up from the grinding medium took place, as occurs with alumina ball milling. The powder was loaded into a 2 inch (51 mm) diameter graphite die which had been liberally coated with boron nitride and hot pressed at 1750° C. for 1 hour under a pressure of 4600 psi (31.7 MPa) to form the dense product substantially (90%) of the alpha'-phase substituted silicon nitride of the general formula:

$Y_x(Si,Al)_{12}(O,N)_{16}$, together with 8% of the beta'-phase of z value 0.2, 2% glass containing yttrium and a trace of free silicon.

TABLE 4

| Eg. No. | Intermediary phase pbw | $Al_2O_3$ pbw | $Si_3N_4$ pbw | $Y_2O_3$ pbw | Hardness Rockwell A | MR (RT) MN.m$^{-2}$ | Density g.cc$^{-1}$ | Phases |
|---|---|---|---|---|---|---|---|---|
| 16 | 75 | 8.89 | 25 | — | 92 | 619.2 | 3.23 | $\beta'z = 0.8$, 3% 12H |
| 17 | 48.4 | 9.55 | 48.4 | — | 92.2 | 639.1 | 3.19 | $\beta'z = 0.38$, t-B |
| 18 | 90 | 8.45 | 10 | — | 91.6 | 595.7 | 3.2 | $\beta'z = 0.9$, 3% 12H t.YAG |
| 19 | 28.6 | 6.35 | 66.7 | 4.7 | 90.5 | 776.4 | 3.24 | $\beta'z = 0.3$ |

All samples heated to 1600° C. and held for 2 hours, followed by an increase to 1750° C. and held for 5 hrs. (pbw = parts by weight)

Examples 16 to 19 have consistently allowed products high in beta'-phase to be produced while allowing the z value to fall below that obtainable with alumina alone.

It will be noted in Example 19 that $Y_2O_3$ was added to the starting mix. This was done since the amount of intermediary phase was low (28.6 pbw) and so yttrium from the alpha'-phase would be low in forming glass to aid densification. Hence $Y_2O_3$ was added to supplement for this deficiency. However, it will be appreciated that other glass forming metal oxides or nitrides can be added such as the oxides or nitrides of magnesium, manganese, iron, lithium, calcium, cerium and the lanthanide series and other rare earths.

These additives can be in the form of compounds capable of being reduced to the required form; although While in this Example, the density was achieved by hot pressing, it would have been possible to achieve the same density without pressure by ensuring that some alumina was included in the mixture, such as by alumina ball milling. However, by employing such an inclusion the weight fraction of the alpha-phase substituted silicon nitride of the general formula:

$Y_x(Si,Al)_{12}(O,N)_{16}$, would have been reduced in the final product.

While the Examples have been demonstrated with yttrium as the cation modifying element, the process and products of the invention are equally effective with other cation modifying elements such as calcium, lithium, magnesium and cerium.

While in the above Examples alumina and/or silicon nitride has been added to the alpha'-phase containing intermediary, it will be appreciated the silicon, nitrogen, aluminium and oxygen could be introduced by using other compounds in place of or in addition to those named. For example, silicon oxynitride or the polytypes referred to earlier could be used.

In a twenty-first Example according to the invention, a mixture comprising 12 parts by weight of the intermediary powder according to Example 7 (ie. containing 87% by weight alpha'-phase, 13% by weight beta'-phase) were mixed with 76 parts by weight of silicon nitride, 7 parts by weight of the 21R material of U.K. Pat. No. 1,573,199, 5 parts by weight $Y_2O_3$ (due to the low level of intermediary phase as explained with respect to Example 19), and the whole was ball milled using alumina media so that there was a pick-up of 2.91 parts by weight. The sintering schedule of 1750° C. for 5 hours followed by annealing at 1400° C. for 5 hours gave a product of 99,700 psi (690 MN.m$^{-2}$) at room temperature, which fell to 52,200 psi (360 MN.m$^{-2}$) at 1200° C., a hardness of 92 on Rockwell 'A' and evidenced high beta'-phase together with approximately 5% by weight alpha'-phase. The z value of the beta'-phase was 1.2. Control of z value would be by increasing the "polytype" level and/or alumina level at the expense of the silicon nitride to increase z values and vice versa to reduce z values. Also if an increase in the alpha'-phase content is required in the final product this can be achieved by increasing the quantity of intermediary while decreasing the silicon nitride level, and reducing the alumina content; or increasing the intermediary content while reducing the $Y_2O_3$ added. When decreasing the alpha'-phase of the final product, it is preferred not to reduce the quantity of the intermediary below 5% of the starting mixture, to ensure that the weight fraction of the intergranular glass phase stays within acceptable limits.

It will be appreciated that while Examples 12 to 21 inclusive have included in the starting mixture, the powder containing a major proportion of the alpha-phase substituted silicon nitride which had been produced according to the second method of the invention, ie a route whereby the powder is of a friable consistency without need for expensive communition processing, the powder could have been produced by other techniques such as that described in Example 1 and good products obtained in accordance with the first aspect of the invention. However, it is obviously preferred to use a powder produced in accordance with the second aspect of the invention.

While the Examples have demonstrated that good products of controlled beta-phase substituted silicon nitride with or without alpha-phase substituted silicon nitride being present can be manufactured from powders containing alpha-phase substituted silicon nitride with or without beta-phase substituted silicon nitride, it is prefered to use starting powders high (>90%) in alpha-phase substituted silicon nitride since this enhances the thermokinetics of the reacting species. Another reason why high alpha-phase intermediaries are preferred is that they enable a greater range of compositional control of resultant products compared with those obtainable by routes involving polytype intermediaries without the presence of alpha-phase intermediaries.

We claim:

1. A method of producing a dense ceramic product comprising the steps of mixing between 5 percent by weight and 96.5 percent by weight of a ceramic powder containing a major proportion of an alpha-phase substituted silicon nitride obeying the formula $M_x(Si,Al)_{12}(O,N)_{16}$, where x is greater than zero but not greater than 2 and M is a modifying cation with at least one nitride of silicon in an amount up to 86.7 percent by weight of the mixture and/or alumina wherein the alumina represents not more than 10% by weight of the mixture; and sintering the mixture in a non-oxidising atmosphere at a temperature of 1700° C. to 1900° C. so as to produce (1) a dense ceramic product consisting essentially of beta-phase substituted silicon nitride having the general formula $Si_{6-z}Al_zN_{8-z}O_z$, where z is greater than zero and not greater than 1.5, and a minor amount of a further phase containing said modifying cation M, or (2) a dense ceramic product consisting essentially of said beta-phase substituted silicon nitride, a controlled amount of an alpha-phase substituted silicon nitride obeying said formula $M_x(Si,Al)_{12}(O,N)_{16}$ and a minor amount of a further phase containing said modifying cation M.

2. A method as claimed in claim 1, in which the alumina content of the mixture containing said ceramic powder is less than or equal to 7.5% by weight.

3. A method as claimed in claim 1, in which said ceramic powder represents 5 to 96.5% by weight of the mixture containing said ceramic powder.

4. A method as claimed in claim 1, in which said ceramic powder is present in an amount of less than 30% by weight of the mixture containing said ceramic powder and at least one glass forming metal oxide selected from yttrium oxide, calcium oxide, lithium oxide, cerium oxide, rare earth oxides and oxides of the lanthanide series, magnesium oxide, manganese oxide, and iron oxide is also included in the mixture containing said ceramic powder.

5. A mixture as claimed in claim 4, in which said at least one glass forming metal oxide is included in an amount of less than 10% by weight of the mixture containing said ceramic powder.

6. A method as claimed in claim 1, in which the silicon nitride is present in an amount up to 75% by weight of the mixture containing said ceramic powder.

7. A method as claimed in claim 6, in which the silicon nitride is present in an amount between 5% and 75% by weight of the mixture containing said ceramic powder.

8. A method as claimed in claim 1 or 6, in which the product after cooling is reheated to devitrify said further phase.

9. A method as claimed in claim 8, in which the reheating temperature is not greater than 1400° C. to devitrify said further phase.

10. A method of manufacturing a ceramic product comprising the steps of effecting a first stage nitriding by heating a powder mixture comprising silicon, aluminium, alumina and an oxide of a modifying cation or a nitride of a modifying cation in a nitriding atmosphere at a temperature below the melting point of aluminium; effecting a second stage nitriding by heating the first stage nitrided mixture at a temperature below the melting point of silicon whilst maintaining a nitriding atmosphere whereby a nitrided friable material is produced; comminuting the friable material thus produced; subsequently sintering the comminuted friable product at a temperature between 1650° C. and 1900° C. whilst maintaining a non-oxidising atmosphere to obtain a friable ceramic material including more than 50% by volume of an alpha-phase substituted silicon nitride obeying the formula $M_x(Si,Al)_{12}(O,N)_{16}$, where x is greater than zero but not greater than 2 and M is the modifying cation, or a friable ceramic material including greater than 50% by volume of a mixture of said alpha-phase substituted silicon nitride and a beta-phase substituted silicon nitride of the formula $Si_{6-z}Al_zN_{8-z}O_z$, where z is greater than zero and not greater than 1.5; mixing a ceramic powder formed of said friable ceramic material in an amount between 5 percent by weight and 96.5 percent by weight with a nitride of silicon and/or alumina wherein the alumina represents not more than 10% by weight of the mixture; and sintering the mixture in a non-oxidising atmosphere at a temperature of 1700° C. to 1900° C. for at least 10 minutes at 1900° C. so as to produce (1) a dense ceramic product consisting essentially of beta-phase substituted silicon nitride having the general formula $Si_{6-z}Al_zN_{8-z}O_z$, where z is greater than zero and not greater than 1.5, and a minor amount of a further phase containing said modifying cation M, or (2) a dense ceramic product consisting essentially of said beta-phase substituted silicon nitride, a controlled amount of an alpha-phase substituted silicon nitride obeying said formula $M_x(Si,Al)_{12}(O,N)_{16}$, and a minor amount of a further phase containing said modifying cation M.

11. A method as claimed in claim 1 or 10, wherein the modifying cation is yttrium, calcium, lithium, magnesium or cerium.

12. A method as claimed in claim 1 or 10, wherein the dense ceramic product (2) contains 0.05% wt. to 90% wt. of said alpha-phase substituted silicon nitride obeying the formula $M_x(Si,Al)_{12}(O,N)_{16}$.

13. A method as claimed in claim 10, wherein said ceramic material (1) or dense ceramic product (2) contains 0.05% wt. to 20% wt. of said further phase.

14. A method of manufacturing a ceramic material comprising the steps of effecting a first stage nitriding by heating a powder mixture comprising silicon, aluminium, alumina and an oxide or nitride of a modifying cation element in a nitriding atmosphere at a temperature below the melting point of aluminium; effecting a second stage nitriding by heating the first stage nitrided mixture at a temperature below the melting point of silicon whilst maintaining a nitriding atmosphere whereby a friable material is produced; comminuting the friable material thus produced and subsequently sintering the comminuted friable material at a temperature between 1650° C. and 1900° C. whilst maintaining a non-oxidising atmosphere to obtain a friable ceramic material including more than 50% by weight of an alpha-phase substituted silicon nitride obeying the formula $M_x(Si,Al)_{12}(O,N)_{16}$, where x is greater than zero but not greater than 2 and M is the modifying cation element, or a friable ceramic material including greater than 50% by weight of a mixture of said alpha-phase substituted silicon nitride and a beta-phase substituted silicon nitride of the formula $Si_{6-z}Al_zN_{8-z}O_z$, where z is greater than zero and not greater than 1.5.

15. A method as claimed in claim 14, in which said modifying cation element is yttrium, calcium, lithium, magnesium or cerium.

16. A method according to claim 14, in which the sintering is conducted at a temperature of the order of 1820° C. and the alpha-phase substituted silicon nitride occupies more than 90% of the friable product.

17. A method according to claim 14, in which the sintering is conducted at a temperature of the order of 1820° C. and for a time of the order of 5 hours wherein the alpha-phase substituted silicon nitride occupies more than 95% of the friable product.

18. A method according to claim 14, in which the modifying cation element is calcium and the elements in the powder mixture are substantially balanced according to the formula $Ca_{0.5}Si_{10.5}Al_{1.5}O_{0.5}N_{15.5}$.

19. A method according to claim 14, in which the mofifying cation element is calcium and the elements in the powder mixture are substantially balanced according to the formula $Ca_{0.8}Si_{9.2}Al_{2.8}O_{1.2}N_{14.8}$.

20. A method according to claim 14, in which the modifying cation element is lithium and the elements in the powder mixture are substantially balanced according to the formula $LiSi_{10}Al_2ON_{15}$.

21. A method according to claim 14, in which the modifying cation element is yttrium and the elements in the powder mixture are substantially balanced according to the formula $Y_{0.4}Si_{10}Al_2O_{0.8}N_{15.2}$.

22. A method according to claim 14, in which the modifying cation element is yttrium and the elements in the powder mixture are substantially balanced according to the formula $Y_{0.6}Si_{9.2}Al_{2.8}O_{1.1}N_{14.9}$.

* * * * *